July 20, 1948.　　　　A. MAS　　　　2,445,446

PROPELLER TRANSMISSION MEANS

Filed March 14, 1947　　　　5 Sheets-Sheet 1

INVENTOR
ANTONIO MAS
BY
ATTORNEY

July 20, 1948.  A. MAS  2,445,446
PROPELLER TRANSMISSION MEANS
Filed March 14, 1947  5 Sheets-Sheet 2

INVENTOR
ANTONIO MAS
BY
ATTORNEY

July 20, 1948.  A. MAS  2,445,446
PROPELLER TRANSMISSION MEANS
Filed March 14, 1947  5 Sheets-Sheet 3

INVENTOR
ANTONIO MAS
BY
ATTORNEY

July 20, 1948.  A. MAS  2,445,446
PROPELLER TRANSMISSION MEANS
Filed March 14, 1947  5 Sheets-Sheet 4
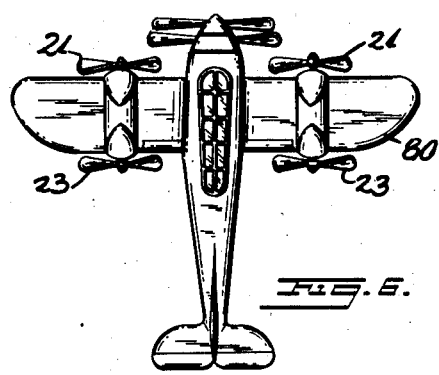
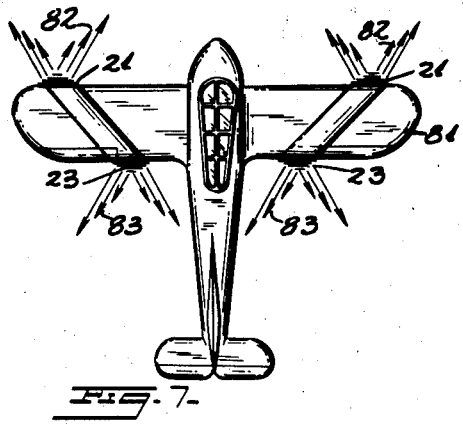
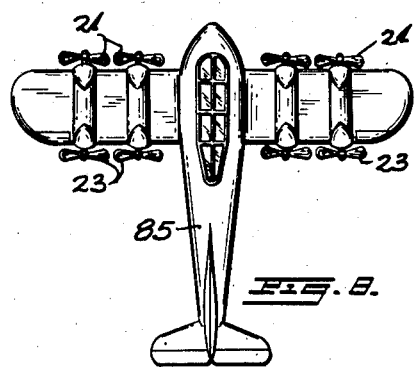
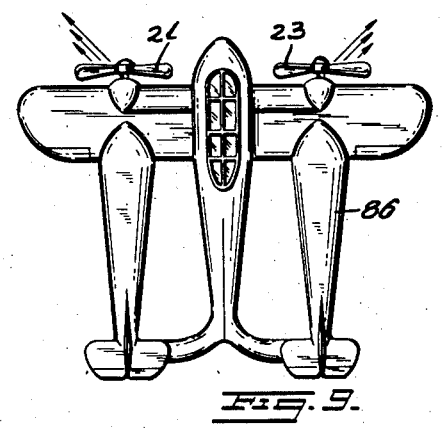
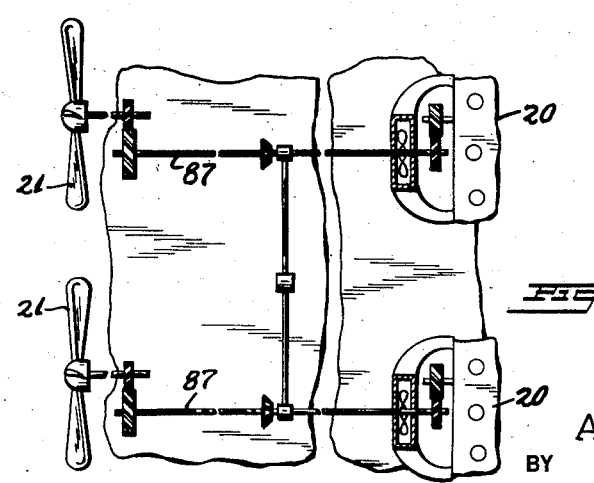
INVENTOR
ANTONIO MAS
BY
ATTORNEY July 20, 1948. A. MAS 2,445,446
PROPELLER TRANSMISSION MEANS
Filed March 14, 1947 5 Sheets-Sheet 5
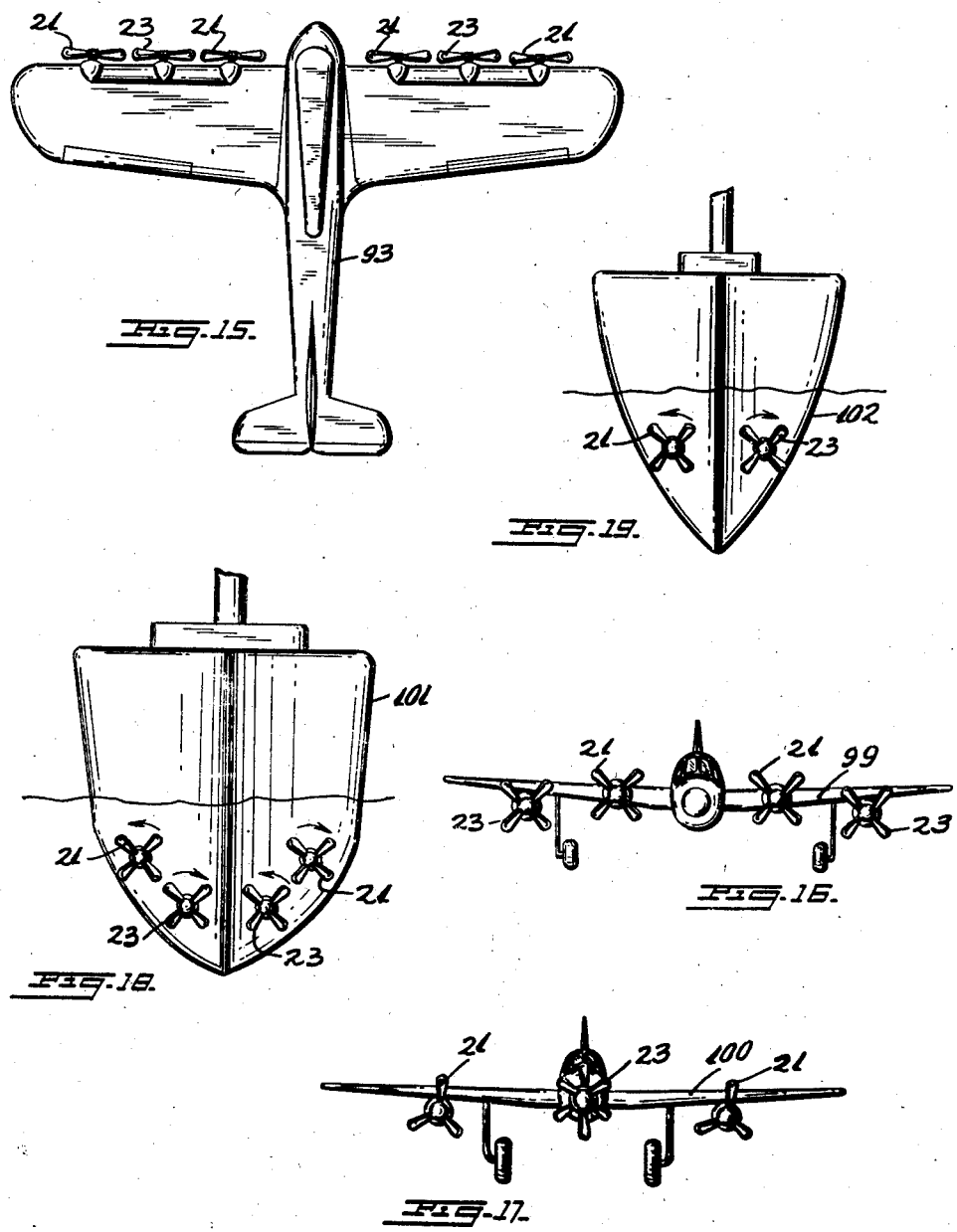
INVENTOR
ANTONIO MAS
BY
ATTORNEY Patented July 20, 1948

2,445,446

UNITED STATES PATENT OFFICE 2,445,446

PROPELLER TRANSMISSION MEANS

Antonio Mas, New York, N. Y.

Application March 14, 1947, Serial No. 734,804

4 Claims. (Cl. 170—135.5)

This invention relates to new and useful improvements in a transmission means for the propellers for all kinds and types such as airplanes, helicopters, ships, submarines, war tanks, automobiles, etc. The new transmission may be driven with any prime mover, such as gas, engines, motors, rocket engines and the like.

It is proposed to characterize the new and improved transmission by the fact that it includes a step-up speed arrangement by which the propellers may be driven at increased speeds. It is proposed to associate a reversing mechanism with each pair of propellers, or certain of the propellers, of a vessel, ship, etc., for the purpose of decreasing the head-on speed for landing, stopping and for other reasons.

More specifically, the invention contemplates a propeller connected directly through a speed transmission mechanism, with a prime mover, and a second propeller connected with the same prime mover through another speed transmission. This latter speed mechanism is provided with a reversing device which includes a clutch by which the second propeller may be connected and disconnected. A novel arrangement is proposed for operating the clutch so that the reversing transmission may be operated by reversing the second propeller, whenever it is desired.

Still further the invention proposes a step-up speed transmission and reversing means for twin propellers, as briefly explained, which will increase the maneuverability of an airplane, ship and other device.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
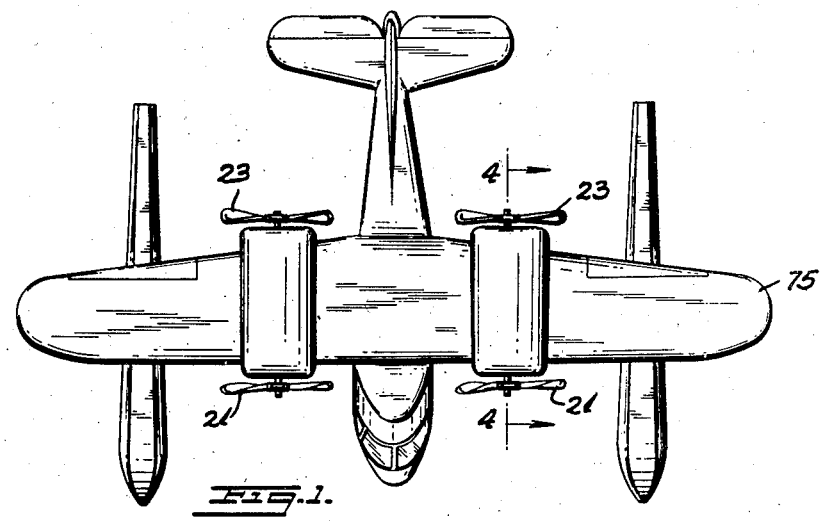
Fig. 1 is a plan view of the airplane provided with a speed transmission and reversing mechanism constructed in accordance with this invention.

Figs. 6 to 9 inclusive are plan views of different types and kinds of airplanes, equipped with reversing means in accordance with this invention.

Fig. 10 is a fragmentary schematic view of a portion of a transmission constructed in accordance with this invention.

Figs. 11 to 13 inclusive are additional plan views of additional designs of airplanes embodying this invention.

Fig. 14 is a side elevational view of still another airplane embodying another form of this invention.

Fig. 15 is a plan view of still another airplane constructed in accordance with this invention.

Figs. 16 and 17 are front views of airplanes embodying still another form of this invention.

Fig. 18 is a front view of a ship embodying this invention.

Fig. 19 is a front view of another ship embodying another form of the invention.

The new and improved step-up speed transmission and reversing means for twin propellers constructed in accordance with that form of the invention illustrated in Figs. 1 to 5, inclusive, includes a prime mover 20 such as an engine or motor. A propeller 21 is connected with the prime mover 20 with a speed step-up transmission 22. This transmission 22 is fixed for driving the propeller 21 in one direction. A second propeller 23 is connected and driven by the prime mover 20. This second propeller 23 is associated with a step-up speed reversing transmission 25 which connects with the prime mover 20. A clutch 26 is provided for disconnecting the transmission 25 when desired. A novel mechanism is proposed for controlling the reversing transmission 25 and clutch 26.

The mechanism mentioned at the end of the previous paragraph includes a rotary electric control consisting of an electric motor 30 driving a rotary contact disc 31 and another rotary contact 32 which are connected with speed gears 33. The arrangement is such that when the motor 30 operates, the contact disc 31 will be driven, and the contact disc 32 will be driven at a much lesser rate of speed. The electric motor 30 is connected in an electric circuit 34 which is controlled by a push button switch 35. This switch 35 controls the reversing of the second propeller 23 as will become clear, as this specification proceeds. The push button switch 35 is one of a gang of switches 36 and 37 connected together for unitary operation.

The clutch 26 has a control lever 40 which is urged in one direction by a spring 41 for urging the clutch into a closed position. The lever 40 may be moved in the other direction for opening up the clutch and disconnecting the transmission 25. The lever 40 is connected with a clutch controlling solenoid 42 which when energized moves the lever 40, to open the clutch 26. The solenoid 42 has a moving armature 43 which is connected with the lever 40. The solenoid 42 is connected in an electric circuit 45 which includes, in series, a pair of spaced contacts 46 and the gang switch 37. The spaced contacts 46 are arranged to be bridged by the contacts 48 which are mounted on the rotary contact disc 31. The arrangement is such that when the rotary contact disc 31 turns, the solenoid 42 will be intermittently energized. The armature 43 of the solenoid 42 is associated with a bolt 50 for restricting the clutch 26 from fully reclosing for a short period of time. More particularly the bolt 50 is in the nature of an armature for a solenoid 51 which is mounted at right angles to the armature 43.

The solenoid 51 is provided with lugs 53 by which it is threadedly supported on adjustment screws 61. By turning the adjustment screws 61 in one direction, or the other, the position of the solenoid 51 may be adjusted so that the bolt armature 50 will be in the correct position, to hold the clutch 26 in a partially opened position, as desired. A spring 52 normally urges the bolt 50 against one side of the armature 53. The solenoid 51 is connected in an electric circuit 54 which includes, in series, a pair of spaced contacts 55 and a solenoid latch 56. The solenoid latch 56 has an armature-like bolt 57 cooperative with a keeper 58 mounted upon a connecting rod 59 of the gang of switches 35, 36, and 37. A spring 60 normally urges the armature bolt 57 into its extended position. When the switches 35, 36 and 37 are closed, the armature bolt 57 will hold them closed, until the latch 56 of the solenoid is energized. Then the switches 35, 36 and 37 reopen, since they are released and since they are like push button switches. The spaced contacts 55 are arranged to be bridged by a contact 61 which is mounted on the rotary contact disc 32.

The reversing transmission 25 is provided with the usual shift lever 65. This shift lever 65 is connected with the armatures 66 to a pair of opposed solenoids 67 and 68. The solenoid 67 is in the nature of a "reverse" solenoid. As soon as it is energized it will move the lever 65 to move the transmission 25 into a reverse condition in which the propeller 23 will turn in the opposite direction. The reverse solenoid 67 is controlled by a time switch 70 which is in a circuit 71 controlled by the gang switch 36. The forward solenoid 68 is connected in a circuit 73 which is controlled by a push button switch 74.

Figure 2:
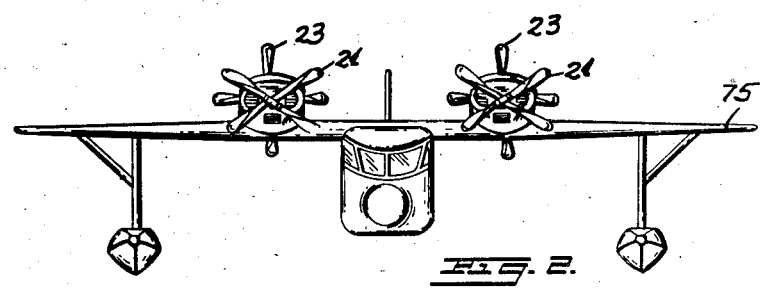
Fig. 2 is a front view of Fig. 1.
Figure 3:
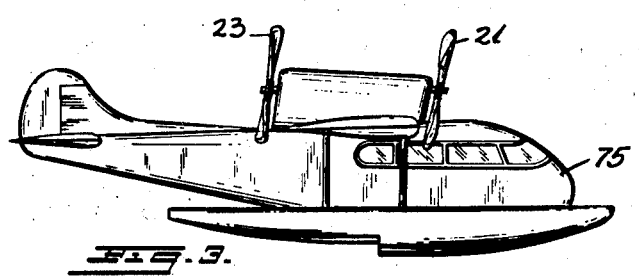
Fig. 3 is a side elevational view of Fig. 1.
Figure 4:
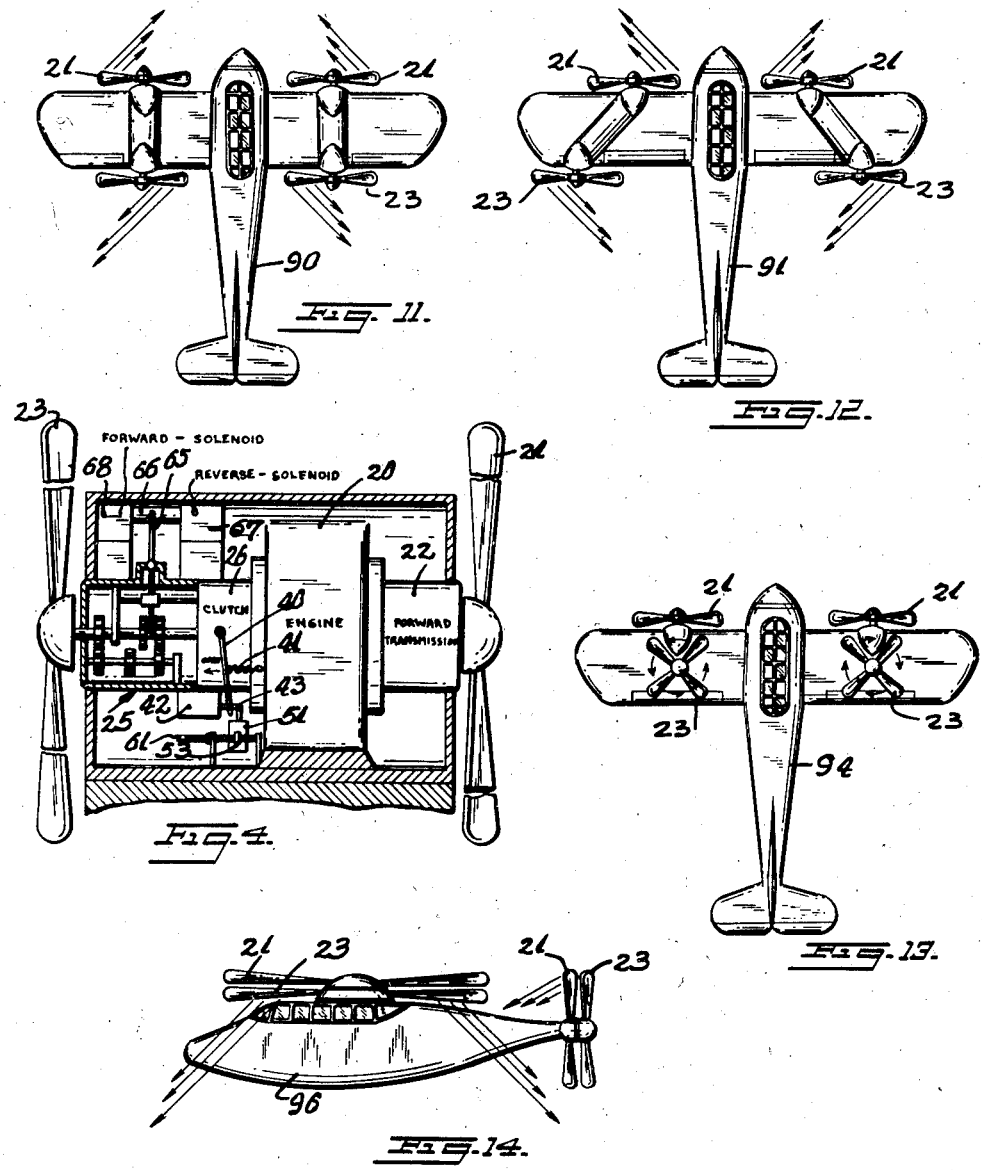
Fig. 4 is a fragmentary/longitudinal sectional view taken on the line 4—4 of Fig. 1.
Figure 5:
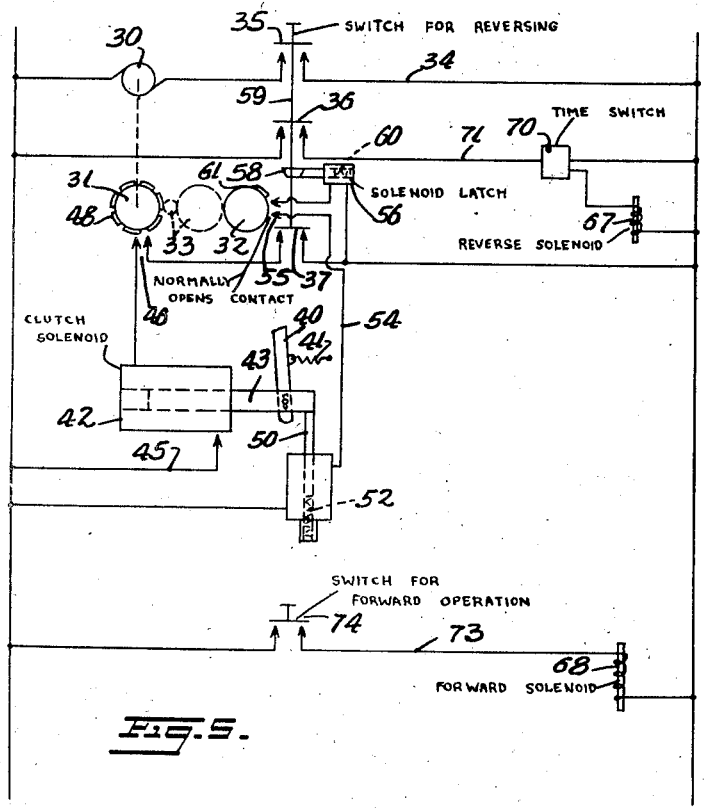
Fig. 5 is a schematic wiring diagram of Fig. 4.

Now referring to Figs. 1, 2 and 3, it should be noted that the airplane 75 is provided with right and left pairs of twin propellers 21 and 23.

The operation of this device may be understood from the following:

Normally the transmission 25 is in its "forward" position and the clutch 26 is closed. Now when the airplane 75 is operated the propeller 21 and 23 will drive forwards. When it is desired to cut down the forward drive of the propellers, the direction of rotation of the propellers 23 is reversed. To do this, the pilot merely depresses the gang of switches 35, 36 and 37. The cam 58 moves below the bolt armature 57 which locks the gang of switches in closed positions. The pilot releases said switches, but they remain closed until actual reversing of the propellers 23 has been accomplished.

When the switch 36 was closed the circuit 34 closed, so that the motor 30 of the rotary control started turning. The motor 30 drives the rotary contact discs 31 and 32. The switch 36 sets the time switch 70 into operation and causes the solenoid 67 to function after a short period of delay. During this period of delay the switch 37 and the rotary contact disc 31 closed the circuit 45 through the clutch solenoid 42. This causes the armature 43 to become retracted, freeing the bolt 50 which moves upwards and prevents the armature 43 from moving back to its initial position. When the armature 43 moved to its retracted position, the lever 40 was pivoted to open the clutch 26. The time switch 70 is so adjusted that after the clutch 26 is open, the reversing solenoid 67 functions to move the transmission 25 into the reverse condition.

The rotary contact disc 31 keeps interrupting the circuit 45 so that the clutch solenoid 42 becomes energized and deenergized. The spring 41 attempts to close the clutch 26, at all times when the solenoid 42 is deenergized. However, the clutch 26 cannot be tightly closed, because of the arresting bolt 50. The action is similar to an automobile operator rapidly opening and closing the clutch during a period when there is excessive strain on the automobile and the engine tends to vibrate.

During this "medium" clutching and declutching, the propeller 23 is gradually brought to a stop and started turning in the opposite direction. By this time, the rotary contact disc 32 has turned to a position in which the contact 61 bridges the very slightly spaced contacts 55. This momentarily closes the circuit 54 through the solenoid latch 56 so that the bolt armature 57 is retracted freeing the cam 58 and thus freeing the switches 35, 36 and 37 which then open. When the circuit 54 was closed, the solenoid 51 was also energized retracting the armature 50 and permitting the armature 43 to become fully extended. This is the moment when the switches 35, 36 and 37 open, causing the parts to remain in this condition. Now the clutch 26 is again closed, and the propeller 23 is reversed.

The propeller 23 is not caused to turn forwards again until after a landing or when the engine 20 has been stopped. Then the switch 74 is closed for energizing the forward solenoid 68 which moves the transmission lever 65 to move the transmission 25 into its forward condition.

In Fig. 6 another embodiment of the invention has been disclosed in which the airplane 80 is shown provided with twin propellers 21 and 23 connected with a prime mover and releasing means, in accordance with this invention.

Fig. 7 is an airplane 81 shown with twin propellers 21 and 23 also connected in accordance with this invention. However, the propellers 21 and 23 are offset from each other. Arrows 82 have been added to indicate that the propellers 21 are operating forwards while arrows 83 indicate the propellers 23 are in reverse.

In Fig. 8 an airplane 85 is illustrated provided with four pairs of propellers 21 and 23 associated with each other in accordance with this invention.

In Fig. 9 an airplane 86 is provided with twin propellers 21 and 23 which are associated with each other in accordance with this invention. The propellers 21 and 23 may be caused to operate in opposite directions.

In Fig. 10 a speed-up transmission 87 is illustrated connected with propellers 21 which in turn are connected with prime movers 20.

In Fig. 11 an airplane 90 is shown provided with pairs of twin propellers 21 and 23 associated with each other in accordance with this invention.

In Fig. 12 still another airplane 91 has been shown with pairs of twin propellers 21 and 23 which are offset from each other.

In Fig. 13 an airplane 94 is shown provided with twin propellers 21 and 23. The propellers 21 and 23 are arranged at right angles to each other. The propellers 21 may locate upon the leading edge of the wing of the airplane, while the propellers 23 are mounted on the top of the wing. If desired, the propellers 23 could also be mounted on the bottom of the wing.

In Fig. 14 an airplane 96 is illustrated provided with twin propellers 21 and 23 arranged adjacent each other. These propellers are located upon the top of the ship and at the back of the ship.

In Fig. 15 the airplane 98 is shown provided with three propellers on each side of the fuselage. Two of the propellers of each set correspond to the propellers 21, while the center propeller of each set corresponds to the reversing propellers 23.

In Fig. 16 another airplane 99 is shown provided with propellers 21 and 23 associated with each other, as already stated, but staggered upon the wings of the airplane.

In Fig. 17 the airplane 100 is shown with propellers 21 upon the wing and a reversing propeller 23 at the front of the fuselage.

In Fig. 18 a ship 101 is shown provided with pairs of propellers 21 and 23, arranged at the back, on opposite sides. There are four propellers in all.

In Fig. 19 another ship 102 is shown with just two of the propellers 21 and 23.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent, is:

1. A reversing means for twin propellers, comprising a prime mover, a propeller connected with said prime mover for turning in one direction, a second propeller to be driven by said prime mover, a reversing transmission for connecting said second propeller with said prime mover, a clutch for disconnecting said second propeller, a rotary electric control, a motor for driving said control, a circuit and a manually operable gang of switches for controlling said motor, a clutch solenoid for opening said clutch, a circuit for controlling said clutch solenoid and including said last named circuit, a bolt for restricting said clutch from fully reclosing, resilient means for urging said bolt closed, a bolt controlling solenoid for opening said bolt, a circuit for said bolt controlling solenoid and including said rotary control for opening said bolt, a reverse control solenoid for said reversing transmission, a circuit including a switch of said gang of switches for controlling said reverse control solenoid, a forward control solenoid for said transmission, a circuit and a manually operable switch for controlling said forward control solenoid, and a solenoid operated latch for releasably holding said gang of switches closed and connected in series with said bolt controlling solenoid.

2. A reversing means for twin propellers, comprising a prime mover, a propeller connected with said prime mover for turning in one direction, a second propeller to be driven by said prime mover, a reversing transmission for connecting said second propeller with said prime mover, a clutch for disconnecting said second propeller, a rotary electric control, a motor for driving said control, a circuit and a manually operable gang of switches for controlling said motor, a clutch solenoid for opening said clutch, a circuit for controlling said clutch solenoid and including said last named circuit, a bolt for restricting said clutch from fully reclosing, resilient means for urging said bolt closed, a bolt controlling solenoid for opening said bolt, a circuit for said bolt controlling solenoid and including said rotary control for opening said bolt, a reverse control solenoid for said reversing transmission, a circuit including a switch of said gang of switches for controlling said reverse control solenoid, a forward control solenoid for said transmission, a circuit and a manually operable switch for controlling said forward control solenoid, and a solenoid operated latch for releasably holding said gang of switches closed and connected in series with said bolt controlling solenoid, said rotary electric control including driven discs with contacts.

3. A reversing means for twin propellers, comprising a prime mover, a propeller connected with said prime mover for turning in one direction, a second propeller to be driven by said prime mover, a reversing transmission for connecting said second propeller with said prime mover, a clutch for disconnecting said second propeller, a rotary electric control, a motor for driving said control, a circuit and a manually operable gang of switches for controlling said motor, a clutch solenoid for opening said clutch, a circuit for controlling said clutch solenoid and including said last named circuit, a bolt for restricting said clutch from fully reclosing, resilient means for urging said bolt closed, a bolt controlling solenoid for opening said bolt, a circuit for said bolt controlling solenoid and including said rotary control for opening said bolt, a reverse control solenoid for said reversing transmission, a circuit including a switch of said gang of switches for controlling said reverse control solenoid, a forward control solenoid for said transmission, a circuit and a manually operable switch for controlling said forward control solenoid, and a solenoid operated latch for releasably holding said gang of switches closed and connected in series with said bolt controlling solenoid, said rotary control including driven discs with contacts, said discs being arranged to rotate at different speeds.

4. A reversing means for twin propellers, comprising a prime mover, a propeller connected with said prime mover for turning in one direction, a second propeller to be driven by said prime mover, a reversing transmission for connecting said second propeller with said prime mover, a clutch for disconnecting said second propeller, a rotary electric control, a motor for driving said control, a circuit and a manually operable gang of switches for controlling said motor, a clutch solenoid for opening said clutch, a circuit for controlling said clutch solenoid and including said last named circuit, a bolt for restricting said clutch from fully reclosing, resilient means for urging said bolt closed, a bolt controlling solenoid for opening said bolt, a circuit for said bolt controlling solenoid and including said rotary control for opening said bolt, a reverse control solenoid for said reversing transmission, a circuit including a switch of said gang of switches for controlling said reverse control solenoid, a forward control solenoid for said transmission, a circuit and a manually operable switch for controlling said forward control solenoid, and a solenoid operated latch for releasably holding said gang of switches closed and connected in series with said bolt controlled solenoid, said resilient means comprising springs.

ANTONIO MAS.

REFERENCES CITED

The following references are of record in the file of this patent:

UNITED STATES PATENTS

| Number | Name | Date |
|---|---|---|
| 1,357,502 | Legros | Nov. 2, 1920 |
| 1,747,334 | Lunstedt | Feb. 18, 1930 |
| 1,827,438 | Rauch | Oct. 13, 1931 |
| 1,957,277 | Le Ray | May 1, 1934 |
| 2,336,787 | Hockney | Dec. 14, 1943 |